R. N. CHAMBERLAIN.
SEPARATOR FOR STORAGE BATTERIES.
APPLICATION FILED MAY 11, 1905.
907,970.
Patented Dec. 29, 1908.
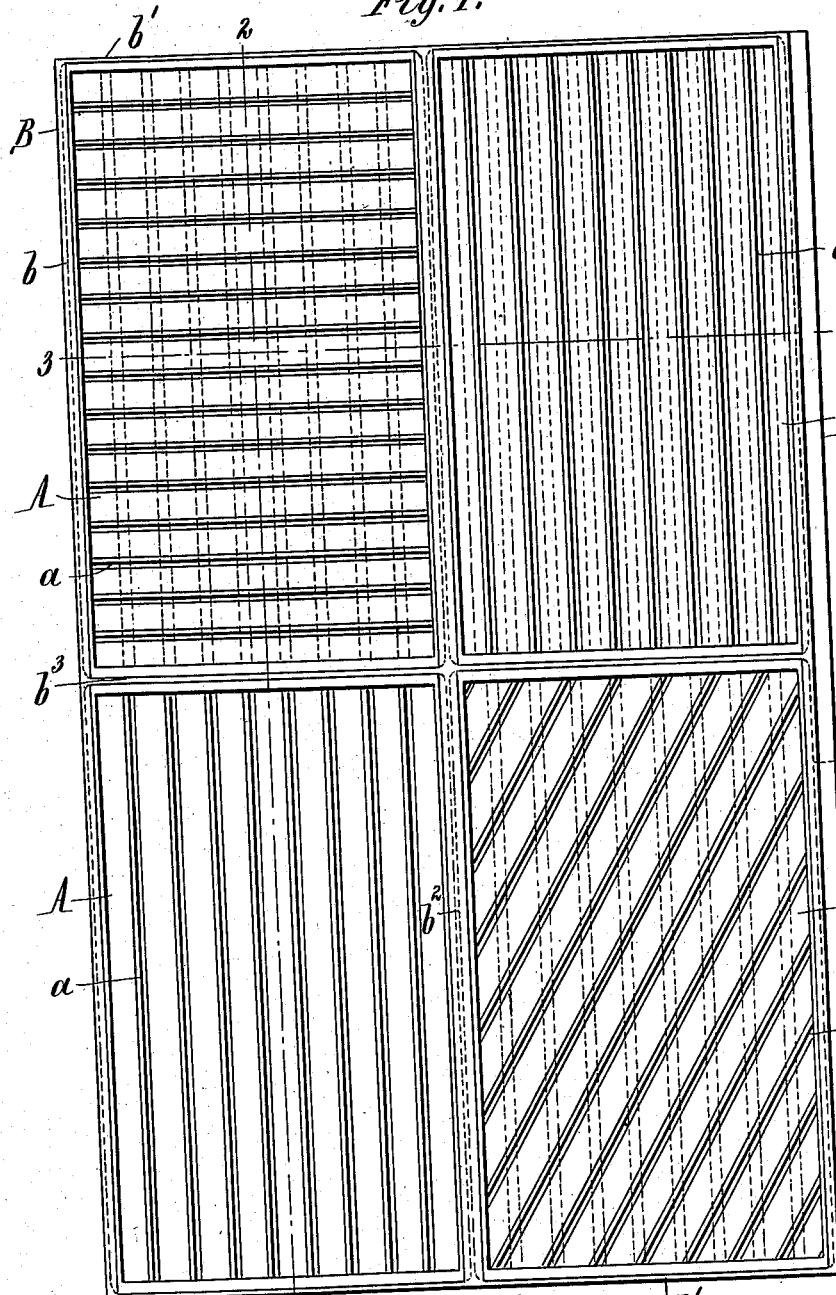
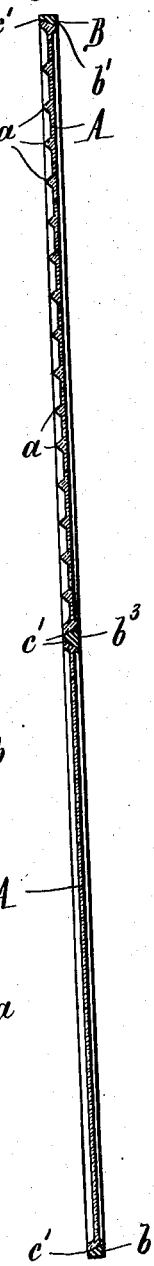
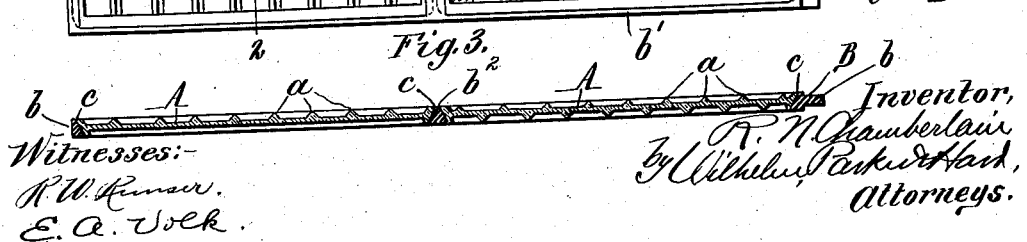

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y.

SEPARATOR FOR STORAGE BATTERIES.

No. 907,970.

Specification of Letters Patent.　　Patented Dec. 29, 1908.

Application filed May 11, 1905. Serial No. 259,980.

*To all whom it may concern:*

Be it known that I, RUFUS N. CHAMBERLAIN, a citizen of the United States, residing at Depew, in the county of Erie and State of New York, have invented a new and useful Improvement in Separators for Storage Batteries, of which the following is a specification.

This invention relates to that kind of separators for storage batteries or accumulators which are made of pervious material of a nature to offer but little resistance to the electrolytic action, while at the same time completely separating and insulating the battery plates of opposite polarity from each other. Such separators have been made of various materials, wood and earthenware being commonly employed, but none of the known separators are entirely satisfactory. Some, for instance those made of wood, are not sufficiently acid proof to last a reasonable length of time, and others that are acid proof, such as those made of earthenware, are too brittle for ordinary service, or are too expensive to manufacture.

The object of this invention is to produce a durable, economical and efficient separator combining the desirable features of the different known kinds of pervious separators, that is a separator having the durability, porosity and acid repelling qualities of the vitrified earthenware separator, and also the flexibility which is the chief advantage of the non-pervious flexible separators made of such material as rubber and celluloid.

To this end the separator comprises a plurality of sections of relatively rigid or brittle pervious material confined in a relatively flexible frame or holder, whereby the separator is given a sufficient flexibility to allow it to accommodate itself to the slight movements or changes in form of the battery plates without breaking the pervious sections.

In the accompanying drawings: Figure 1 is a side elevation of a separator embodying the invention. Fig. 2 is a longitudinal sectional elevation thereof in line 2—2, Fig. 1. Fig. 3 is a cross-sectional elevation thereof in line 3—3, Fig. 1.

Like letters of reference refer to like parts in the several figures.

The separator consists of a plurality of sections A of suitable non-conducting material, such, for instance, as pottery, earthenware or wood, and a holder or frame B of some suitable, relatively flexible, acid proof or semi-acid proof material, such as rubber or celluloid. The sections A consist of thin sheets or plates which are pervious to a suitable extent by reason of the pervious character of the material, and also, if desired, by reason of perforations or openings formed in the plates in any suitable manner. The sections are preferably reinforced by ribs $a$ or other suitable projections in any desired manner. The drawing illustrates several different ways of arranging such ribs on the plates, for instance, the section A at the upper left-hand corner of the separator is provided with horizontal ribs on one side and with upright ribs on the opposite side, which provide circulating channels for the electrolyte, while the section A at the lower left-hand corner of the separator is provided with vertical ribs on one side only, the other side being plane, and the other sections show still different arrangements of the ribs.

In the separator illustrated in the drawings, the pervious sections, of which there are four, are of rectangular shape and are secured in the correspondingly shaped spaces formed between the side and end bars $b$ $b'$ and the cross bars $b^2$ $b^3$ of the rectangular frame B, but the number and shape of the sections and their relative arrangement in the frame is immaterial and may differ as the size or intended use may render desirable.

A simple and effective way of securing the pervious sections in the frame is shown in the drawings. Each section has two opposite forwardly-facing beveled edges $c$ which bear against corresponding rearwardly beveled faces on one side bar $b$ and one cross bar $b^2$ of the frame, and two opposite rearwardly beveled edges $c'$ which bear against forwardly beveled edges on the other two frame bars so that the section cannot be dislodged from the frame. The separator thus constructed can be conveniently made by laying the pervious sections in a mold with spaces between them, filling the spaces with rubber, celluloid or analogous material in a plastic condition, and then vulcanizing or hardening the plastic material until sufficiently firm to properly hold the sections. The frame can, however, be made and the sections secured therein in any other suitable manner.

The described construction produces a very desirable and durable separator. The small sections of pervious material are not so liable to be broken as a single large piece of the same material, and they can be produced at much less expense than larger pieces. As the frame connecting the sections is flexible the separator as a whole has more or less flexibility permitting enough distortion thereof to allow for slight movements and changes in form of the battery plates. Thus the separator affords the known advantages of the frail and brittle pervious material, such as pottery or earthenware, and yet has the chief advantage, that is the flexibility, of the less desirable separators made of flexible non-pervious material, such as rubber, or celluloid.

I claim as my invention:

1. A separator for accumulators, comprising a plurality of separate sections of relatively rigid non-conducting material arranged substantially in the same plane, and a flexible holder of non-conducting material for retaining said sections in place, whereby the separator as a whole is somewhat flexible, substantially as set forth.

2. A separator for accumulators, comprising a plurality of sections of relatively rigid non-conducting material arranged substantially edge to edge, and a frame of insulating material composed of slender flexible bars forming compartments in which said sections are confined, whereby the separator as a whole has some flexibility, substantially as set forth.

3. A separator for accumulators, comprising a flexible frame of insulating material having slender circumferential and cross-bars forming intervening spaces, and a plurality of sections of relatively rigid non-conducting pervious material confined in the spaces between said frame bars, substantially as set forth.

4. A separator for accumulators, comprising a frame having bars forming intervening spaces, and a plurality of sections of relatively rigid non-conducting material held in the spaces between said frame bars, said frame bars which extend at an angle to each other at adjacent sides of each section having beveled edges facing in opposite directions and coöperating with oppositely facing beveled edges on the section, substantially as set forth.

5. A separator for accumulators, comprising a flexible frame having bars forming intervening spaces, and a plurality of sections of relatively rigid non-conducting pervious material held in the spaces between said frame bars, said frame bars which extend at an angle to each other at adjacent sides of each section having beveled edges facing in opposite directions and coöperating with oppositely facing beveled edges on the section, substantially as set forth.

Witness my hand this 6th day of May, 1905.

RUFUS N. CHAMBERLAIN.

Witnesses:
   EDWARD WILHELM,
   C. B. HORNBECK.